(12) United States Patent
Choi et al.

(10) Patent No.: US 10,219,077 B2
(45) Date of Patent: Feb. 26, 2019

(54) DISPLAY DEVICE

(71) Applicant: SAMSUNG DISPLAY CO., LTD., Yongin-si, Gyeonggi-do (KR)

(72) Inventors: Byeong-Hwa Choi, Seoul (KR); Seung-Bae Lee, Seoul (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/658,771

(22) Filed: Jul. 25, 2017

(65) Prior Publication Data

US 2018/0035208 A1 Feb. 1, 2018

(30) Foreign Application Priority Data

Jul. 26, 2016 (KR) .................. 10-2016-0095062

(51) Int. Cl.
| | |
|---|---|
| *H04R 3/12* | (2006.01) |
| *G06F 1/16* | (2006.01) |
| *G06F 3/16* | (2006.01) |
| *H04R 1/02* | (2006.01) |
| *H04R 5/02* | (2006.01) |
| *H04R 17/00* | (2006.01) |

(52) U.S. Cl.
CPC ............ *H04R 3/12* (2013.01); *G06F 1/1652* (2013.01); *G06F 3/165* (2013.01); *G06F 3/167* (2013.01); *H04R 1/028* (2013.01); *H04R 5/02* (2013.01); *H04R 17/00* (2013.01); *H04R 2430/01* (2013.01); *H04R 2499/11* (2013.01); *H04R 2499/15* (2013.01)

(58) Field of Classification Search
CPC . H04R 3/12; H04R 1/028; H04R 5/02; H04R 17/00; H04R 2430/01; H04R 2499/11; H04R 2499/15; G06F 1/1652; G06F 3/165; H01L 51/5237; H01L 51/0097; H01L 51/448; Y02E 10/549; H01K 2251/5338; G09F 9/301
USPC ........... 381/59, 423, 124; 313/510, 511, 512
See application file for complete search history.

(56) References Cited

U.S. PATENT DOCUMENTS

| | | | |
|---|---|---|---|
| 2006/0105817 A1* | 5/2006 | Naick .................... | H04M 19/04 455/567 |
| 2009/0087002 A1* | 4/2009 | Nakaya .................. | H04R 19/02 381/191 |
| 2012/0242592 A1 | 9/2012 | Rothkopf et al. | |
| 2013/0009882 A1* | 1/2013 | Salmela .................. | G06F 3/016 345/173 |
| 2014/0049463 A1* | 2/2014 | Seo ....................... | G06F 3/0487 345/156 |

(Continued)

OTHER PUBLICATIONS

Lee et al. "Study on the Piezoelectric Direct Effect of PVDF Film", Journal of the Korean Institute of Electrical and Electronic Material Engineers, vol. 13, No. 9, pp. 786-790, 2000.

*Primary Examiner* — William A Jerez Lora
(74) *Attorney, Agent, or Firm* — Lee & Morse P.C.

(57) ABSTRACT

A display device includes a foldable display panel module to fold in a folding region, a folding sensor to sense a folding state of the foldable display panel module, a support on the foldable display panel module in the rigid region, a vibrator on the foldable display panel module in the folding region, and a vibration controller to control a vibration operation of the vibrator based on the folding state.

20 Claims, 11 Drawing Sheets

(56) References Cited

U.S. PATENT DOCUMENTS

2015/0131237 A1 5/2015 Chen et al.
2015/0177789 A1* 6/2015 Jinbo .................... G06F 1/1652
　　　　　　　　　　　　　　　　　　　313/511

* cited by examiner

DISPLAY DEVICE

CROSS REFERENCE TO RELATED APPLICATION

Korean Patent Application No. 10-2016-0095062, filed on Jul. 26, 2016, and entitled: "Display Device," is incorporated by reference herein in its entirety.

BACKGROUND

1. Field

One or more embodiments described herein relate to a display device.

2. Description of the Related Art

Foldable and flexible display devices have been developed. These devices may include a base film, a display panel module, a polarizer, a touch screen panel, and a window that are sequentially stacked. Adhesive layers may be located between these elements. When the display device is folded or bent for a long time, the adhesive layers may harden. As a result, the shape of the display device may be deformed.

SUMMARY

In accordance with one or more embodiments, a display device includes a folding region and a rigid region, a foldable display panel module to fold in the folding region; a folding sensor to sense a -folding state of the foldable display panel module; a support on the foldable display panel module in the rigid region; a vibrator on the foldable display panel module in the folding region; and a vibration controller to control a vibration operation of the vibrator based on the folding state.

The vibration controller may generate a first control signal to control the vibrator to vibrate for a first time period and with a first amplitude and a first duration when the foldable display panel module is folded during a first threshold time. The vibration controller may generate a second control signal to control the vibrator to vibrate for a second time period less than the first time period when the foldable display panel module is folded during a second threshold time longer than the first threshold time. The vibration controller may generate a third control signal to control the vibrator to vibrate with a second amplitude greater than the first amplitude when the foldable display panel module is folded during a second threshold time longer than the first threshold time.

The foldable display panel module may generate a fourth control signal to control the vibrator to vibrate with a second duration longer than the first duration when the foldable display panel module is folded during a second threshold time longer than the first threshold time. The vibration controller may receive audio data and to generate a control signal to control the vibrator to generate sound corresponding to the audio data. The vibration controller may adjust a volume of the sound based on a folding angle of the foldable display panel module.

The vibrator may include a first electrode; a second electrode opposing the first electrode; and a vibration film between the first electrode and the second electrode. The vibration film may include a polyvinylidene fluoride (PVDF) piezoelectric film. The folding sensor may be between the foldable display panel module and the vibrator in the folding region.

In accordance with one or more other embodiments, a display device includes a first folding region, a second folding region, and a rigid region, a foldable display panel module to fold in the first folding region and the second folding region; a folding sensor to sense a first folding state of the first folding region and a second folding state of the second folding region; a support on the foldable display panel module in the rigid region; first and second vibrators on the foldable display panel module in the first and second folding regions, respectively; and a vibration controller to control vibration operations of the first and second vibrators based on the first and second folding states.

The vibration controller may receive audio data and to generate a control signal to control the first and second vibrators to generate sound corresponding to the audio data. The vibration controller may determine a sound mode based on the first folding state and the second folding state and may control the first and second vibrators based on the determined sound mode, wherein the sound mode is one of a stereo mode, a mono mode, or a mute mode.

In accordance with one or more other embodiments, a display device includes a flexible display panel module including first to (N)th regions, where N is an integer greater than 0; a bending sensor to sense a bending state of each of the first to (N)th regions; first through (N)th vibrators in the first to (N)th regions, respectively; and a vibration controller to control a vibration operation of the first to (N)th vibrators based on the bending state of each of the first through (N)th regions.

The vibration controller may generate a first control signal to control a (K)th vibrator to vibrate for a first time period and with a first amplitude and a first duration when a bending degree of a (K)th region of the flexible display panel module is greater than a threshold value during a first threshold time, where K is an integer between 1 and N. The vibration controller may generate a second control signal to control at least one of the vibrators to vibrate with a second time period less than the first time period when the bending degree of the (K)th region of the flexible display panel module is greater than the threshold value during a second threshold time longer than the first threshold time.

The vibration controller is to generate a third control signal to control at least one of the vibrators to vibrate with a second amplitude greater than the first amplitude when the bending degree of the (K)th region of the flexible display panel module is greater than the threshold value during a second threshold time longer than the first threshold time.

The vibration controller may generate a fourth control signal to control at least one of the vibrators to vibrate for a second duration longer than the first duration when the bending degree of the (K)th region of the flexible display panel module is greater than the threshold value during a second threshold time longer than the first threshold time.

The vibration controller may receive audio data and to generate a control signal to control at least one of the first to (N)th vibrators to generate a sound corresponding to the audio data. The vibration controller may adjust a volume of the sound based on a bending degree of the flexible display panel module.

In accordance with one or more other embodiments, a flexible display device includes a display module; a sensor to sense a folding state of the display module; and a vibrator to vibrate the display module based on the folding state.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
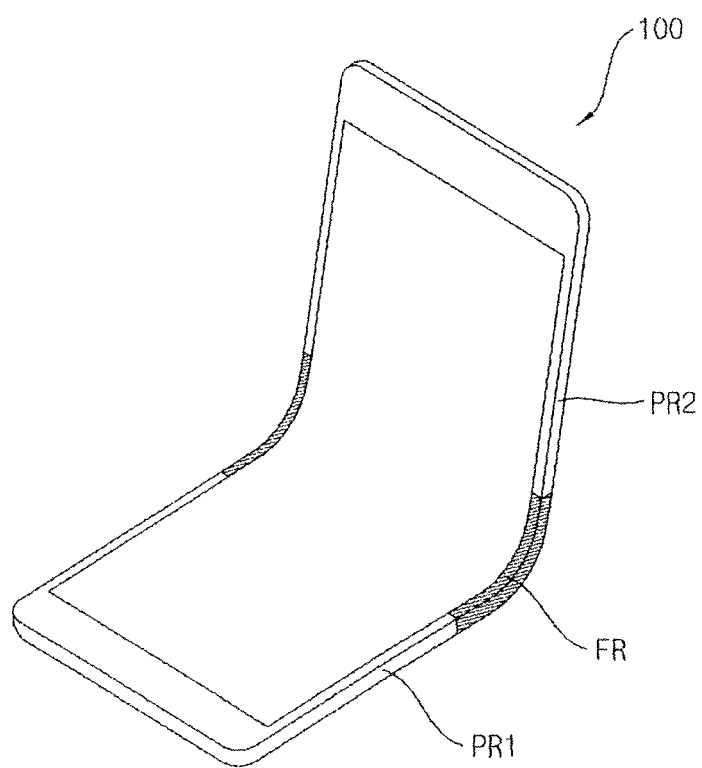
FIG. 1 illustrates an embodiment of a display device.

Example embodiments will be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Figure 2A:
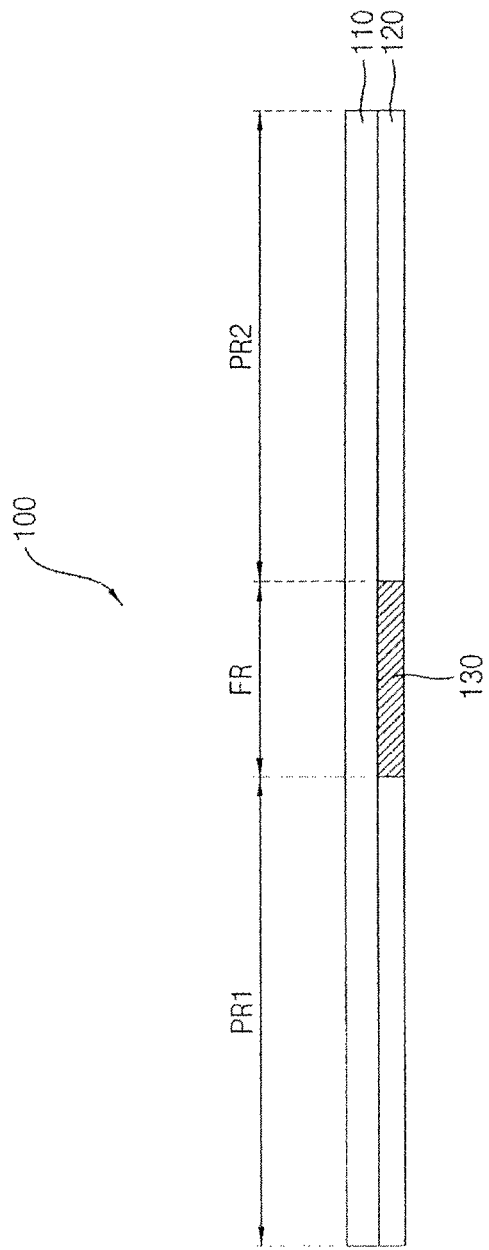
FIG. 2A illustrates an example of the display device in an unfolded state.
Figure 2B:
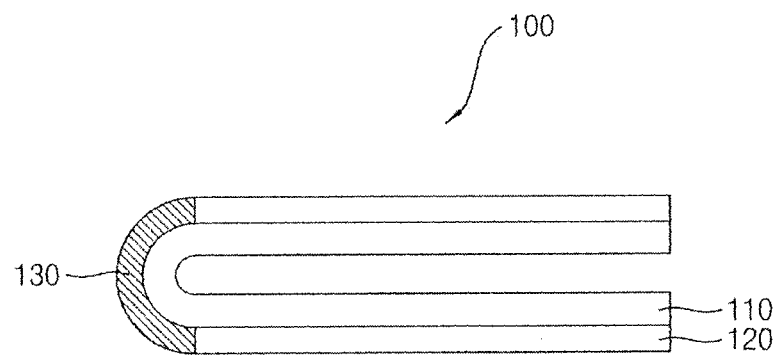
FIG. 2B illustrates an example of the display device in a folded state.

FIG. 1 illustrates an embodiment of a display device 100, FIGS. 2A illustrates the display device 100 when unfolded, and FIG. 2B illustrates the display device 100 when folded. Referring to FIGS. 1, 2A, and 2B, the display device 100 may include a folding region FR, and a rigid region PR1, PR2. The display device 100 may be a foldable display device that folds in the folding region FR.

The display device 100 may include a foldable display panel module 110, a support unit 120, and a vibration unit 130. The foldable display panel module 110 may be foldable in the folding region FR. The shape of the foldable display panel module 110 may not change in the rigid region PR1, PR2. The foldable display panel module 110 may include various structures for displaying an image. For example, the foldable display panel module 110 may include a base film, a display panel, a polarizer, a touch screen panel, a window, etc.

The support unit 120 may be on a surface the foldable display panel module 110 in the rigid region PR1, PR2 to support the foldable display panel module 110. In one example embodiment, the support unit 120 may include a frame for maintaining the shape of the foldable display panel module 110, a driving circuit for driving the foldable display panel module 110, a power supply for providing the power to the display device 100, etc.

The vibration unit 130 may be on the surface of the foldable display panel module 110 in the folding region FR and may vibrate based on a folding state of the foldable display panel module 110. For example, a folding sensor may sense the folding state of the foldable display panel module 110, and a vibration control unit may control a vibration operation of the vibration unit 130 based on the folding state. The folding state may be either when the display device 100 is folded or unfolded.

In one example embodiment, as shown in FIG. 2A, when the foldable display panel module 110 is unfolded, the vibration unit 130 does not vibrate. On the other hand, as shown in FIG. 2B, when the foldable display panel module 110 is folded, the vibration unit 130 may vibrate.

In one example embodiment, the vibration unit 130 may include a sound vibration film generating sound based on received audio data. The sound vibration film may be or include, for example, polyvinylidene fluoride (PVDF) piezoelectric film. Therefore, the sound vibration film may be a thin-film, e.g., the thickness of the vibration film may be less than about 1 mm and may operate as a speaker.

The example embodiments of FIGS. 2A and 2B describe that the display device is an in-folding display device, e.g., one in which a display surface of the foldable display panel module 110 is folded inwardly. In another embodiment, the display device may be an out-folding display device, e.g., one in which the display surface of the foldable display panel module 110 is folded outwardly.

Figure 3:
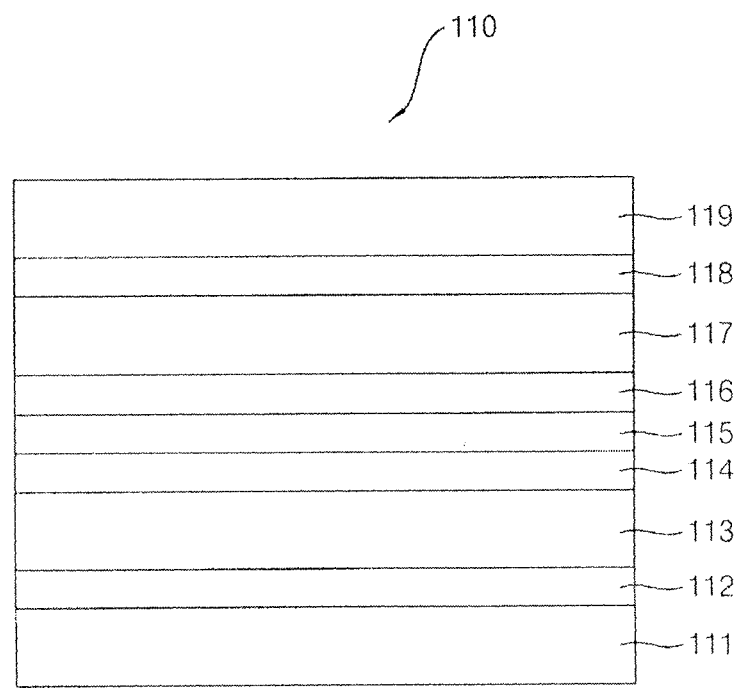
FIG. 3 illustrates an embodiment of a display panel module.

FIG. 3 illustrates an embodiment of the display panel module 110 in cross section. Referring to FIG. 3, the foldable display panel module 110 may have a structure which is capable of folding or bending. For example, the foldable display panel module 110 may include a base film 111, a display panel 113, a polarizer 115, a touch screen panel 117, a window 119, and adhesive layers 112, 114, 116, 118.

The base film 111 may be under the display panel 113 to protect the display panel 113. In one embodiment, the base film 111 may include at least one film having polyimide (PI).

The display panel 113 may be on the base film 111 and may adhere to the base film 111 by a first adhesive layer 112. In one example embodiment, the display panel 113 may be an organic light emitting display panel including an organic light emitting diode (OLED). For example, the display panel 113 may include a lower substrate, an organic display unit, an upper substrate, etc.

The polarizer 115 may be on the display panel 113 and may adhere to the display panel 113 by a second adhesive layer 114.

The touch screen panel 117 may be on the polarizer 115 and may adhere to the polarizer 115 by a third adhesive layer 116. In one example embodiment, the touch screen panel 117 may include a folding sensor. For example, the folding state of the foldable display panel module 110 may be sensed by sensing a resistance change of two transparent electrodes opposing each other in the touch screen panel 117.

The window 119 may be on the touch screen panel 117 and may adhere to the touch screen panel 117 by a fourth adhesive layer 118. For example, the window 119 may include a window layer (e.g., including a polyimide) and a hard coating layer covering the window layer.

The first through fourth adhesive layers 112, 114, 116, 118 may be pressure sensitive adhesive (PSA) films. The PSA film may include, for example, at least one of urethane-based material, acryl-based material silicone-based material, etc.

In the embodiment of FIG. 3, the foldable display panel module 110 includes a base film 111, a display panel 113, a polarizer 115, a touch screen panel 117, a window 119, and adhesive layers 112, 114, 116, 118. The foldable display panel module 110 may have a different structure that is capable of folding or bending in another embodiment.

Figure 4:
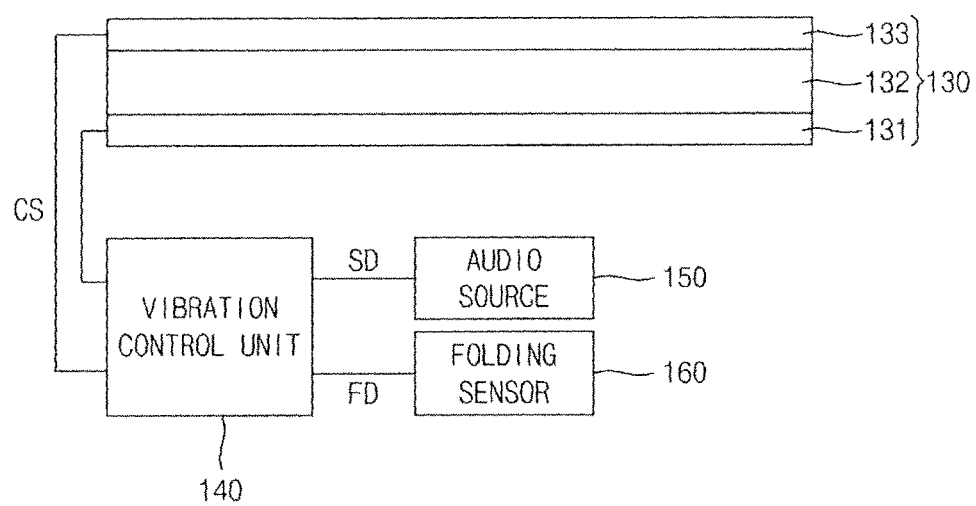
FIG. 4 illustrates an embodiment which includes a vibration unit, a vibration control unit, an audio source, and a folding sensor.
Figure 5:
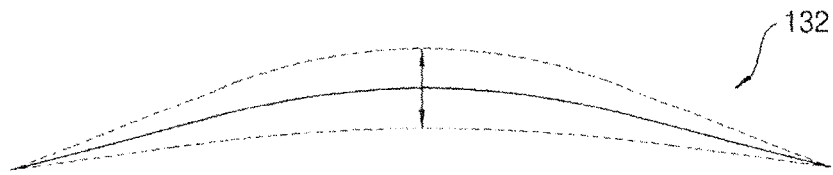
FIG. 5 illustrates an example of a vibration operation.

FIG. 4 illustrates an embodiment of the vibration unit 130, a vibration control unit, an audio source, and a folding sensor which may be included in the display device of FIG. 1. FIG. 5 illustrates an example of a vibration operation of a vibration film in the vibration unit of FIG. 4.

Referring to FIGS. 4 and 5, the vibration unit 130 may receive a control signal CS from the vibration control unit 140 and may vibrate based on the control signal CS. The vibration unit 130 may include a first electrode 131, a second electrode 133 opposing to the first electrode 131, a vibration film 132 between the first electrode 131 and the second electrode 133. In one example embodiment, the vibration film 132 may be a sound vibration film vibrating based on the control signal CS to generate sound. For example, the vibration film 132 may be PVDF piezo film. Therefore, a voltage that forms a potential difference between the first electrode 131 and the second electrode 133 may be applied to the vibration unit 130 based on the control signal CS. Accordingly, as illustrated in FIG. 5, the vibration film 132 may vibrate by expanding and contracting, and then sound can be generated by pushing and pulling the ambient air of the vibration film 132.

The vibration control unit 140 may receive folding state data FD of the foldable display panel module from the folding sensor 160 and provide a control signal CS for vibrating the vibration unit 130 to the vibration unit 130 based on the folding state data FD. For example, when the foldable display panel module is folded for a predetermined time, the vibration control unit 140 may generate the control signal CS for vibrating the vibration unit 130. As a result, deformation of the display panel module may be prevented. In one embodiment, the vibration control unit 140 may be inside of the support unit.

In one example embodiment, the vibration control unit 140 may receive audio data SD from an audio source 150 and may generate a control signal CS to control the vibration unit to generate a sound corresponding to the audio data SD. Thus, the vibration unit 130 may operate as a speaker, and the vibration control unit 140 may operate as a sound adjusting device for volume control (e.g., an amplifier), tone, and/or balance control of the speaker. In one example embodiment, the vibration control unit 140 may adjust the volume of the sound based on a folding angle of the foldable display panel module. For example, the sound may be recognized as being relatively large by a user as the folding angle increases in an in-folding display device. Therefore, the vibration control unit 140 of the in-folding display device may decrease the volume of the sound as the folding angle increases. On the other hand, the sound may be recognized as being relatively small by a user as the folding angle increases in an out-folding display device. Therefore, the vibration control unit 140 of the out-folding display device may increase the volume of the sound as the folding angle increases.

In one example embodiment, when the audio data SD are received from the audio source 150, the vibration control unit 140 may generate the control signal CS to control the vibration unit 130 to generate sound corresponding to the audio data SD. On the other hand when the audio data are not received from the audio source 150, the vibration control unit 140 may generate the control signal CS to control the vibration unit 130 to vibrate in a range in which the sound is not recognizable by a user.

The audio source 150 may provide the audio data SD from an external source or may be stored inside of the audio source 150 to the vibration control unit 140.

The folding sensor 160 may sense the folding state of the foldable display panel module, and may generate the folding state data FD. The folding sensor 160 may be foldable or bendable by itself, and may sense the folding state based on a characteristic that the resistance value varies depending on the degree of bending. The folding sensor 160 may include, for example, an optical fiber bend sensor, a pressure sensor, a strain gauge, etc. In one example embodiment, the folding sensor 160 may be between the foldable display panel module and the vibration unit 130 in the folding region. In another example embodiment, the folding sensor 160 may be implemented in the touch screen panel module of the foldable display panel module.

Figure 6:
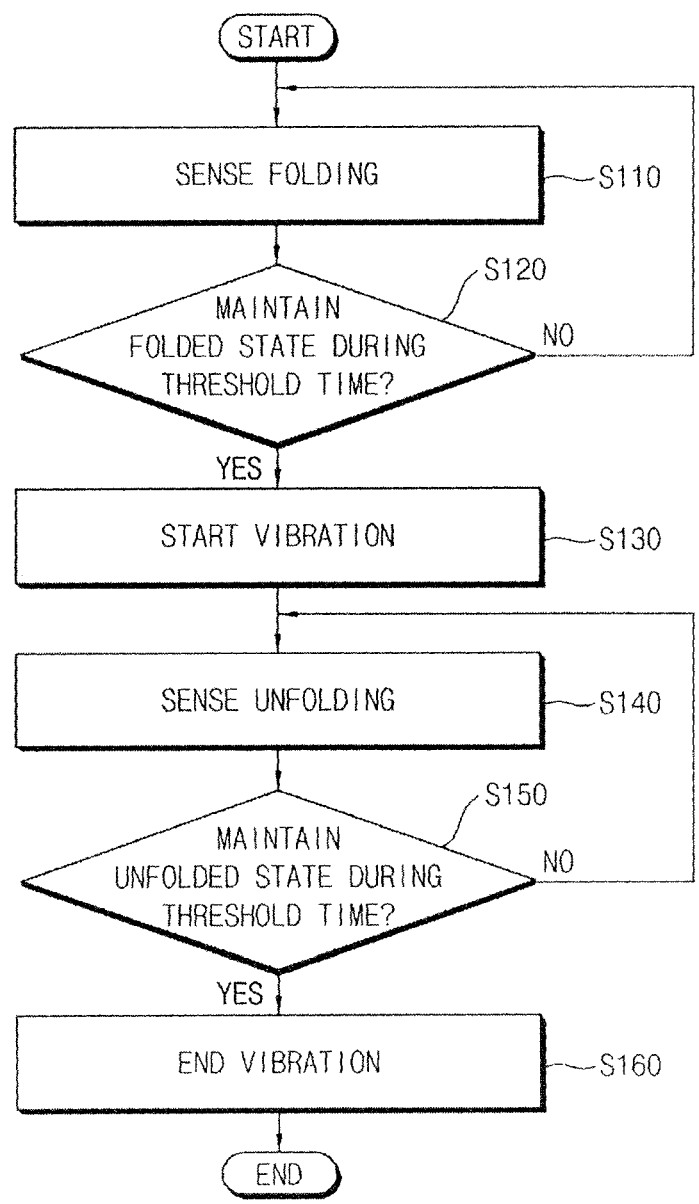
FIG. 6 illustrates an embodiment of a method for controlling a vibration operation.

FIG. 6 illustrates an embodiment of a method for controlling a vibration operation of the vibration unit of FIG. 4. Referring to FIG. 6, the vibration unit may vibrate to prevent deformation of the foldable display panel module when the foldable display panel module is folded for a predetermined time.

According to this method, the folding sensor may sense that the foldable display panel module is folded (S110). For example, the folding sensor may perceive the folding state of the foldable display panel module as being folded when the folding angle of the foldable display panel module is greater than a predetermined angle.

An operation may then performed to confirm whether the foldable display panel module is folded during a threshold time (S120). In one example embodiment, the threshold time may be a fixed time greater than 0 seconds. In another example embodiment, the threshold time may be changed according to a variety of predetermined conditions. For example, the threshold time may decrease as the number of times the foldable display panel module is folded (e.g., the number of folded times) increases to effectively prevent deformation of the display panel module. The display device may store the number of folded times and the threshold time may be changed using, for example, a look-up table including a relationship between the number of folded times and the threshold time. In one embodiment, the threshold time may decrease as a driving time of the display panel module increases.

The vibration unit may start to vibrate when the foldable display panel module is folded during the threshold time (S130). The folding sensor may sense that the folding state of the foldable display panel module is changed to the unfolded state (S140). An operation may be performed to confirm whether the foldable display panel module is unfolded during the threshold time (S150). The vibration unit may stop vibrating when the foldable display panel module is unfolded during the threshold time (S160).

FIGS. 7A to 7D are timing diagrams illustrating examples for controlling the vibration unit of FIG. 4. Referring to FIGS. 7A through 7D, the vibration control unit may generate a control signal CS for repeatedly vibrating the vibration unit based on folding state data FD. For example the control signal CS may correspond to a potential difference between the first electrode and the second electrode.

Figure 7A:
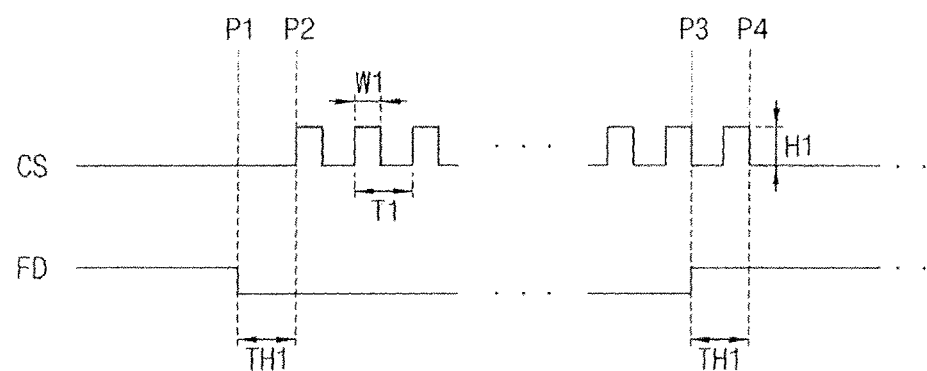
FIGS. 7A to 7D illustrate examples for controlling a vibration unit.

Referring to FIG. 7A, the vibration control unit generates a control signal CS to control the vibration unit to vibrate with a first time period T1, a first amplitude H1, and a first duration W1 when the foldable display panel module is folded during a first threshold time TH1.

At the first time point P1, the folding state data FD may be changed from the high level to the low level. Then, the vibration control unit may detect that the display panel module is folded. At the second time point P2, because the folding state of the display panel module is maintained in the folded state during the first threshold time TH1, the vibration control unit may generate the control signal CS to control the vibration unit to vibrate with the first time period T1, the first amplitude H1, and the first duration W1. At the third time point P3, the folding state data FD may be changed from the low level to high level. Then, the vibration control unit may detect that the display panel module is unfolded. At the fourth time point P4, because the folding state of the display panel module is maintained in the unfolded state during the first threshold time TH1, the vibration control unit may control the vibration unit to not vibrate.

In FIG. 7A, the threshold times for starting or stopping the vibration operation of the vibration unit are the same as each other (e.g., the first threshold time TH1). In one embodiment, the threshold times for starting or stopping the vibration operation of the vibration unit may be different from each other.

When the foldable display panel module is folded during a second threshold time longer than the first threshold time, the vibration control unit may generate a control signal CS to control at least one of a time period, an amplitude, or a duration of the vibration operation of the vibration unit in order to prevent deformation of the display panel module.

Figure 7B:
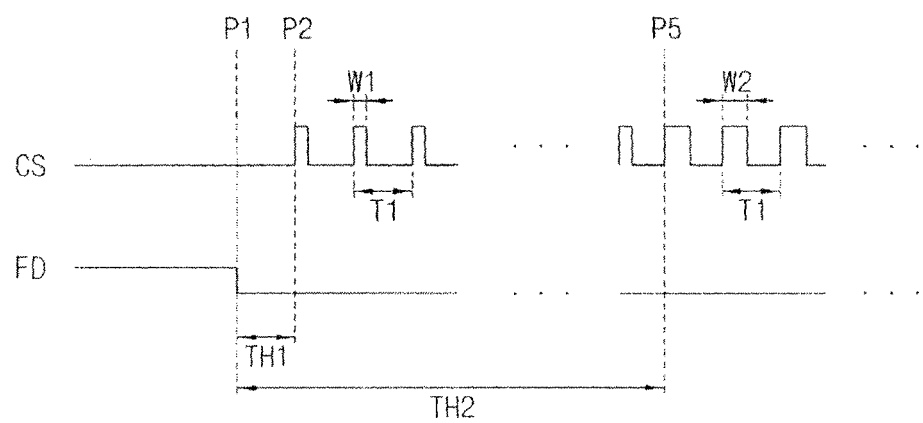

Referring to FIG. 7B, the vibration control unit generates a control signal CS to control the vibration unit to vibrate with a first time period T1, a first amplitude H1, and a first duration W1 when the foldable display panel module is folded during a first threshold time TH1. Thereafter, the foldable display panel module generates the control signal CS to control the vibration unit to vibrate with a second duration W2 longer than the first duration W1 when the foldable display panel module is folded during a second threshold time TH2 longer than the first threshold time TH1. When the vibration unit vibrates for the first duration W1, power consumption may be small in comparison with the second duration W2. When the vibration unit vibrates for the second duration W2, deformation of the display panel module may be prevented more effectively in comparison with the first duration W1.

In one embodiment, at the first time point P1, the folding state data FD may be changed from the high level to the low level. Then, the vibration control unit may detect that the display panel module is folded. At the second time point P2, because the folding state of the display panel module is maintained in the unfolded state during the first threshold time TH1, the vibration control unit may generate the control signal CS to control the vibration unit to vibrate with the first time period T1, the first amplitude H1, and the first duration W1. At the fifth time point P5, because the folding state of the display panel module is maintained in the folded state during the second threshold time TH2, the vibration control unit may generate the control signal CS to control the vibration unit to vibrate with the first time period T1, the first amplitude H1, and the second duration W2. Accordingly, the vibration unit vibrates for a longer time, and deformation of the display panel module may be prevented more effectively.

Figure 7C:
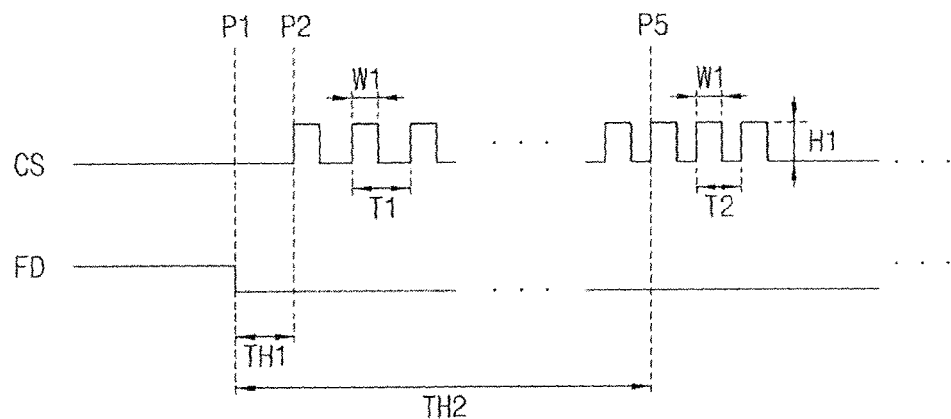

Referring to FIG. 7C, the vibration control unit generates the control signal CS to control the vibration unit to vibrate with a first time period T1, a first amplitude H1, and a first duration W1 when the foldable display panel module is folded during the first threshold time TH1. Thereafter, the foldable display panel module generates the control signal CS to control the vibration unit to vibrate with a second time period T2 less than the first time period T1 when the foldable display panel module is folded during the second threshold time TH2 longer than the first threshold time TH1. When the vibration unit vibrates with the first time period T1, the power consumption may be small in comparison with the second time period T2. When the vibration unit vibrates with the second time period T2, deformation of the display panel module may be prevented more effectively in comparison with the first time period T1.

In one embodiment, at the first time point P1, the folding state data FD may be changed from the high level to the low level. Then, the vibration control unit may detect that the display panel module is folded. At the second time point P2, because the folding state of the display panel module is maintained in the folded sate during the first threshold time TH1, the vibration control unit may generate the control signal CS to control the vibration unit to vibrate for the first time period T1, the first amplitude H1, and the first duration W1. At the fifth time point P5, because the folding state of the display panel module is maintained in the folded state during the second threshold time TH2, the vibration control unit may generate the control signal CS to control the vibration unit to vibrate for the second time period T2, the first amplitude H1, and the first duration W1. Accordingly, the vibration unit vibrates at a greater frequency, and deformation of the display panel module may be prevented more effectively.

Figure 7D:
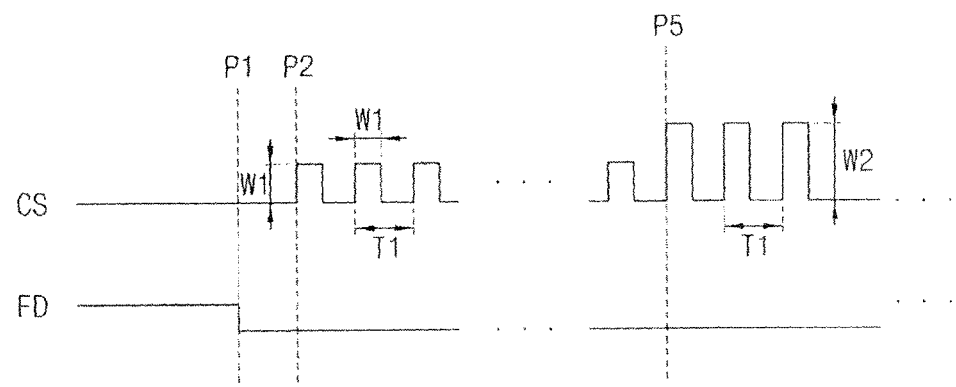

Referring to FIG. 7D, the vibration control unit generates a control signal CS to control the vibration unit to vibrate for a first time period T1, a first amplitude H1, and a first duration W1 when the foldable display panel module is folded during the first threshold time TH1. Thereafter, the foldable display panel module generates the control signal CS to control the vibration unit to vibrate with a second amplitude H2 greater than the first amplitude H1 when the foldable display panel module is folded during a second threshold time TH2 longer than the first threshold time TH1. When the vibration unit vibrates with the first amplitude H1, the power consumption may be small in comparison with the second amplitude H2. When the vibration unit vibrates with the second amplitude H2, deformation of the display panel module may be prevented more effectively in comparison with the first amplitude H1.

In one embodiment, at the first time point P1, the folding state data FD may be changed from the high level to the low level. Then, the vibration control unit may detect that the display panel module is folded. At the second time point P2, because the folding state of the display panel module is maintained in the unfolded state during the first threshold time TH1, the vibration control unit may generate the control signal CS to control the vibration unit to vibrate for the first time period T1, the first amplitude H1, and the first duration W1. At the fifth time point P5, because the folding state of the display panel module is maintained in the folded state during the second threshold time TH2, the vibration control unit may generate the control signal CS to control the vibration unit to vibrate for the first time period T1, the second amplitude H2, and the first duration W1. Accordingly, the vibration unit vibrates at a relatively large amplitude, and deformation of the display panel module may be prevented more effectively.

Figure 8A:
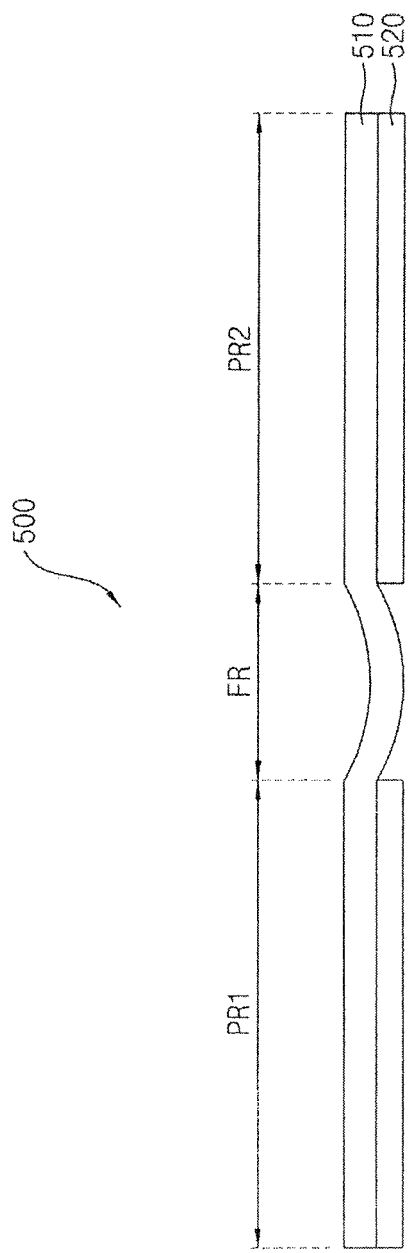
FIG. 8A illustrates one type of display device and FIG. 8B illustrates an embodiment of display device.
Figure 8B:
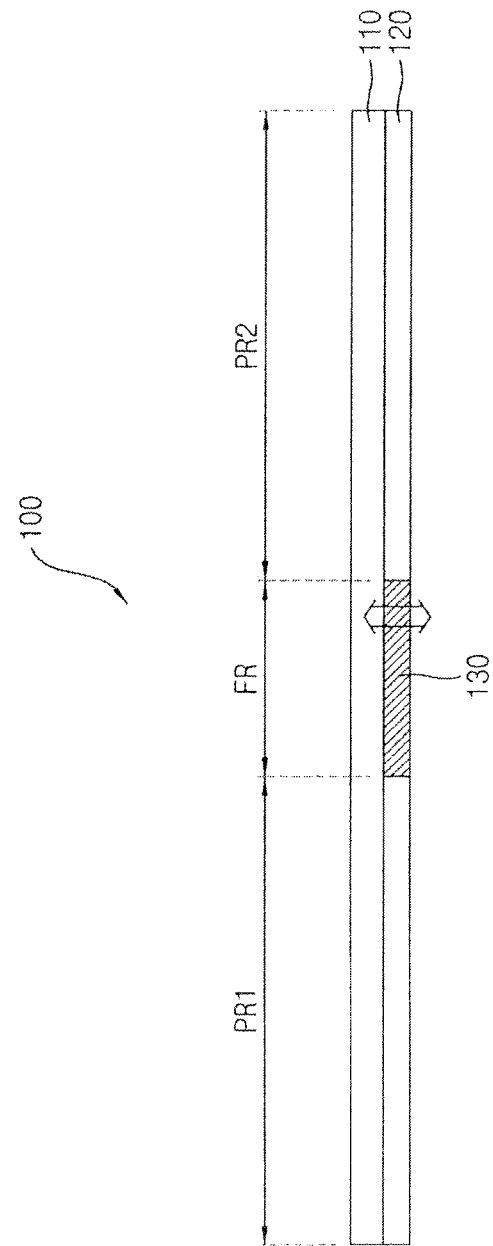

FIG. 8A illustrates one type of display device 500 and FIG. 8B illustrates an embodiment of display device 100. Referring to FIG. 8A, display device 500 may have a structure in which a support unit 520 is removed under the foldable display panel module 510 in the folding region FR. In this case, after the foldable display panel module 510 had been in the folded state for a long time, deformation of the foldable display panel module 510 occurs as a result of hardening of the adhesive layers in the foldable display panel module 510.

Referring to FIG. 8B, display device 100 includes the vibration unit 130 under the foldable display panel module 110 in the folding region FR. In this case, deformation of the foldable display panel module 110 may be improved by vibrating the vibration unit 130 when the foldable display panel module 110 is folded for a threshold time.

Figure 9:
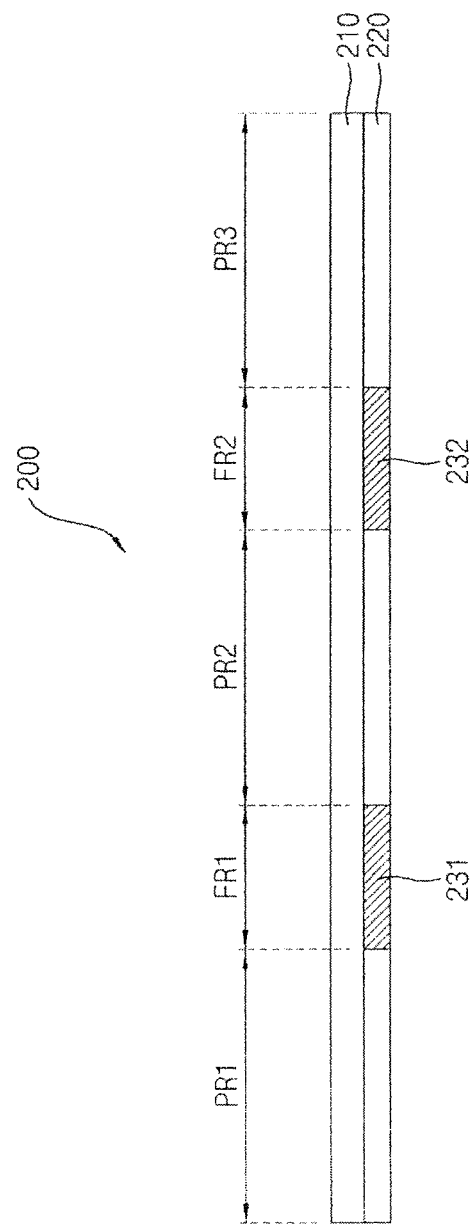
FIG. 9 illustrates another embodiment of a display device.

FIG. 9 illustrates another embodiment of a display device 200 which includes first and second folding region FR1, FR2 and first through third rigid region PR1, PR2, PR3. The display device 200 may be a foldable display device that folds in the folding regions. The display device 200 may include a foldable display panel module 210, a support unit 220, and first and second vibration unit2 231, 232. The display device 200 may be substantially the same as the display device in FIG. 2A, except that the display device include two folding regions.

The foldable display panel module 210 may be foldable in the first and second folding regions FR1, FR2. The shape of the foldable display panel module 110 may not be changed in the first through third rigid regions PR1, PR2, PR3.

The support unit 220 may be on a surface the foldable display panel module 210 in the rigid regions PR1, PR2, PR3 to support the foldable display panel module 210.

The first vibration unit 231 may be on the surface of the foldable display panel module 210 in the first folding region FR1 and may vibrate based on a first folding state of the foldable display panel module 210 corresponding to the first folding region FR1. The second vibration unit 232 may be on the surface of the foldable display panel module 210 in the second folding region FR2 and may vibrate based on a second folding state of the foldable display panel module 210 corresponding to the second folding region FR2. A folding sensor may sense the first folding state and the second folding state of the foldable display panel module 210. A vibration control unit may control a vibration operation of the first vibration unit 231 based on the first folding state and may control a vibration operation of the second vibration unit 232 based on the second folding state.

In one example embodiment, the vibration control unit may receive audio data and generate a control signal to control the first and second vibration units 231, 232 to generate sound corresponding to the audio data. The vibration control unit may determine a sound mode based on the first folding state and the second folding state, so that the first and second vibration units are driven in one of a stereo mode, a mono mode, or a mute mode. For example, the vibration control unit may control the vibration units so that the vibration units in the folding regions operate as a speaker. When the first folding state and the second folding state correspond to the unfolded state, the vibration control unit may set the sound mode to the mute mode in which the vibration units do not generate the sound. When only one of the first folding state and the second folding state corresponds to the folded state, the vibration control unit may set the sound mode to the mono mode in which the vibration units generates the sound with one channel, e.g., only the unfolded vibration unit generates the sound. When both of the first folding state and the second folding state correspond to the folded state, the vibration control unit may set the sound mode to the stereo mode in which the vibration units generate the sound with two channels.

The example embodiment of FIG. 9 included two vibration units. The display device may include three or more vibration units in another embodiment.

Figure 10:
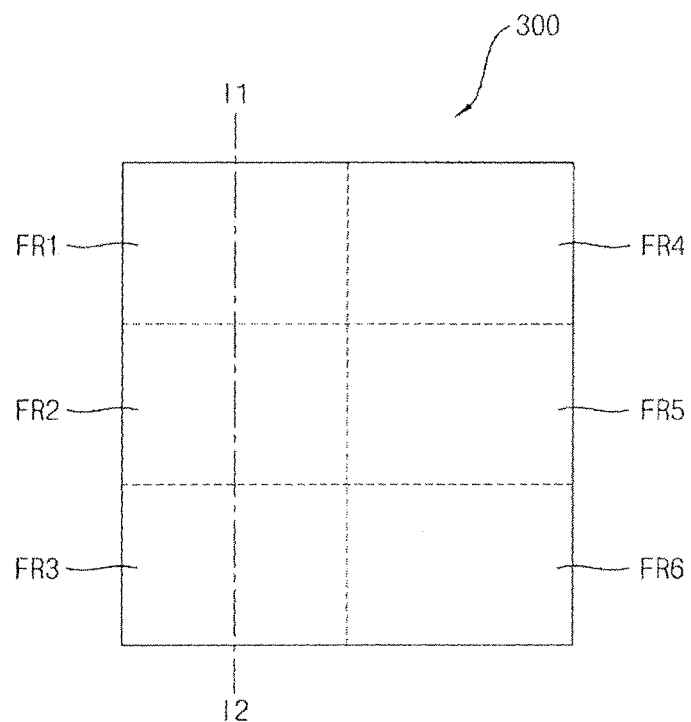
FIG. 10 illustrates another embodiment of a display device.
Figure 11:
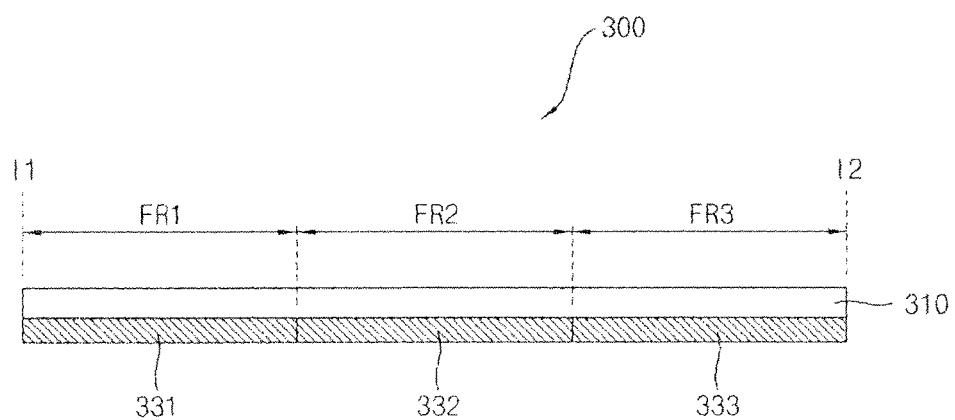
FIG. 11 illustrates an example of a view I1-I2 in FIG. 10.

FIG. 10 illustrates another embodiment of a display device 300, and FIG. 11 illustrates an embodiment of a cross-sectional view taken along line I1-I2 in FIG. 10.

Referring to FIGS. 10 and 11, the display device 300 may be a flexible display device. The display device 300 may include a flexible display panel module 310 and a plurality of vibration units 331, 332, 333, etc. The flexible display panel module 310 may include first through sixth regions FR1 through FR6.

First through sixth vibration units 331, 332, 333, etc., may be under a surface of the flexible display panel module 310 and may correspond to the first through sixth regions FR1 through FR6, respectively. One or more bending sensor may sense the bending states of the first through sixth regions FR1 through FR6. A vibration control unit may control a vibration operation of each of the first through sixth vibration units 331, 332, 333, etc., based on the sensed bending state. For example, the bending sensor may sense that the first region FR1 is bent over a threshold bending degree. Then, the vibration control unit (inside or outside of the display device) may generate the control signal to control the first vibration unit 331 to vibrate.

In one example embodiment, the vibration control unit may generate a control signal such that a (K)th vibration unit vibrates for a first time period, a first amplitude, and a first duration when a bending degree of a (K)th region of the flexible display panel module is greater than a threshold value during a first threshold time, where K is an integer between 1 and N. In one example embodiment, the vibration control unit may generate a control signal to control the vibration unit to vibrate with a second time period less than the first time period when the bending degree of the (K)th region is greater than the threshold value during a second threshold time, which is longer than the first threshold time.

In one example embodiment, the vibration control unit may generate a control signal to control the vibration unit to vibrate with a second amplitude greater than the first amplitude when the bending degree of the (K)th region is greater than the threshold value during a second threshold time, which is longer than the first threshold time. In one example embodiment, the vibration control unit may generate a control signal such that the vibration unit vibrates with a second duration longer than the first duration when the bending degree of the (K)th region is greater than the threshold value during a second threshold time which is longer than the first threshold time.

In one example embodiment, the vibration control unit may receive audio data and generate a control signal to control at least one of the first through sixth vibration units to generate sound corresponding to the audio data. In one example embodiment, the vibration control unit may adjust the volume of the sound based on a bending degree of the flexible display panel module 310. For example, when the flexible display panel module 310 is bent inwardly, the sound may be recognized to be relatively large by a user as the bending degree increases. Therefore, the vibration control unit may decrease the volume of the sound as the bending degree increases. On the other hand, when the flexible display panel module 310 is bent outwardly, the sound may be recognized to be relatively small by a user as the bending degree increases. Therefore, the vibration control unit may increase the volume of the sound as the bending degree increases. In example embodiments, the vibration units operate as speakers.

In FIGS. 10 and 11, the first through sixth vibration units are entirely disposed on respective regions of the foldable display panel module 310. In one embodiment, the first through sixth vibration units are on at least a portion of each region of the foldable display panel module 310, and the vibration control unit may be in at least one region of the foldable display panel module 310.

Also, in FIGS. 10 and 11, the foldable display panel module 310 includes the first through sixth regions FR1 through FR6. In one embodiment, the foldable display panel module 310 may include regions and/or the vibration control unit may have a circular shape in at least a portion of the foldable display panel module 310.

The aforementioned embodiments may be in an electronic device having the display device. Examples of the electronic device include but are not limited to a personal computer, notebook computer, cellular phone, smart phone, and a smart pad.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The control units and other signal processing features of the disclosed embodiments may be implemented in logic which, for example, may include hardware, software, or both. When implemented at least partially in hardware, the control units and other signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the control units and other signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device including a folding region and a rigid region, the display device comprising:
   a foldable display panel module to fold in the folding region;
   a folding sensor to sense a folding state of the foldable display panel module;
   a support on the foldable display panel module in the rigid region;
   a vibrator on the foldable display panel module in the folding region; and
   a vibration controller to control a vibration operation of the vibrator based on the folding state.

2. The display device as claimed in claim 1, wherein the vibration controller is to generate a first control signal to control the vibrator to vibrate for a first time period and with a first amplitude and a first duration when the foldable display panel module is folded during a first threshold time.

3. The display device as claimed in claim 2, wherein the vibration controller is to generate a second control signal to control the vibrator to vibrate for a second time period less than the first time period when the foldable display panel module is folded during a second threshold time longer than the first threshold time.

4. The display device as claimed in claim 2, wherein the vibration controller is to generate a third control signal to control the vibrator to vibrate with a second amplitude greater than the first amplitude when the foldable display panel module is folded during a second threshold time longer than the first threshold time.

5. The display device as claimed in claim 2, wherein the foldable display panel module is to generate a fourth control signal to control the vibrator to vibrate with a second duration longer than the first duration when the foldable display panel module is folded during a second threshold time longer than the first threshold time.

6. The display device as claimed in claim 1, wherein the vibration controller is to receive audio data and to generate a control signal to control the vibrator to generate sound corresponding to the audio data.

7. The display device as claimed in claim 1, wherein the vibrator is only in the folding region, the vibrator being external to the foldable display panel module.

8. The display device as claimed in claim 1, wherein the vibrator includes:
   a first electrode;
   a second electrode opposing the first electrode; and
   a vibration film between the first electrode and the second electrode, and wherein the first and second electrodes with the vibration film therebetween are foldable and completely overlap the folding region.

9. The display device as claimed in claim 8, wherein the vibration film includes a polyvinylidene fluoride (PVDF) piezoelectric film.

10. The display device as claimed in claim 1, wherein the folding and rigid regions have constant boundaries, and the folding sensor is between the foldable display panel module and the vibrator in the folding region.

11. A display device including a first folding region, a second folding region, and a rigid region, the display device comprising:
   a foldable display panel module to fold in the first folding region and the second folding region;
   a folding sensor to sense a first folding state of the first folding region and a second folding state of the second folding region;
   a support on the foldable display panel module in the rigid region;
   first and second vibrators on the foldable display panel module in the first and second folding regions, respectively; and
   a vibration controller to control vibration operations of the first and second vibrators based on the first and second folding states.

12. The display device as claimed in claim 11, wherein the vibration controller is to receive audio data and to generate a control signal to control the first and second vibrators to generate sound corresponding to the audio data.

13. The display device as claimed in claim 12, wherein the vibration controller is to determine a sound mode based on the first folding state and the second folding state and is to control the first and second vibrators based on the determined sound mode, wherein the sound mode is one of a stereo mode, a mono mode, or a mute mode.

14. A display device, comprising:
   a flexible display panel module including first to (N)th regions, where N is an integer greater than 0;
   a bending sensor to sense a bending state of each of the first to (N)th regions;
   first through (N)th vibrators located in the first to (N)th regions, respectively; and
   a vibration controller to control a vibration operation of the first to (N)th vibrators based on the bending state of each of the first through (N)th regions.

15. The display device as claimed in claim 14, wherein the vibration controller is to generate a first control signal to control a (K)th vibrator to vibrate for a first time period and with a first amplitude and a first duration when a bending degree of a (K)th region of the flexible display panel module is greater than a threshold value during a first threshold time, where K is an integer between 1 and N.

16. The display device as claimed in claim 15, wherein the vibration controller is to generate a second control signal to control at least one of the vibrators to vibrate with a second time period less than the first time period when the bending degree of the (K)th region of the flexible display panel module is greater than the threshold value during a second threshold time longer than the first threshold time.

17. The display device as claimed in claim 15, wherein the vibration controller is to generate a third control signal to control at least one of the vibrators to vibrate with a second amplitude greater than the first amplitude when the bending degree of the (K)th region of the flexible display panel module is greater than the threshold value during a second threshold time longer than the first threshold time.

18. The display device as claimed in claim 15, wherein the vibration controller is to generate a fourth control signal to control at least one of the vibrators to vibrate for a second duration longer than the first duration when the bending degree of the (K)th region of the flexible display panel module is greater than the threshold value during a second threshold time longer than the first threshold time.

19. The display device as claimed in claim 14, wherein the vibration controller is to receive audio data and to generate a control signal to control at least one of the first to (N)th vibrators to generate a sound corresponding to the audio data.

20. The display device as claimed in claim 19, wherein the vibration controller is to adjust a volume of the sound based on a bending degree of the flexible display panel module.

* * * * *